US008646181B2

(12) United States Patent
Baumann et al.

(10) Patent No.: US 8,646,181 B2
(45) Date of Patent: Feb. 11, 2014

(54) SHAFT-HUB COMPONENT AND METHOD FOR MANUFACTURING A COMPONENT OF THIS TYPE

(75) Inventors: Matthias Baumann, Lahr (DE); Juergen Koeninger, Appenweier (DE); Eduard Schuster, Lichtenau-Muckenschopf (DE); Edgar Ernst, Buehl (DE); Alfred Zink, Achern (DE); Juergen Vierling, Gambsheim (DE)

(73) Assignee: Robert Bosch GmbH, Stuttgart (DE)

( * ) Notice: Subject to any disclaimer, the term of this patent is extended or adjusted under 35 U.S.C. 154(b) by 193 days.

(21) Appl. No.: 12/745,475

(22) PCT Filed: Nov. 19, 2008

(86) PCT No.: PCT/EP2008/065835
§ 371 (c)(1),
(2), (4) Date: Oct. 25, 2010

(87) PCT Pub. No.: WO2010/051861
PCT Pub. Date: May 14, 2010

(65) Prior Publication Data
US 2011/0050029 A1    Mar. 3, 2011

(30) Foreign Application Priority Data

Nov. 30, 2007   (DE) .......................... 10 2007 057 704
Nov. 5, 2008    (DE) .......................... 10 2008 043 488

(51) Int. Cl.
*B21D 53/28*    (2006.01)
(52) U.S. Cl.
USPC ....................................................... 29/893.2

(58) Field of Classification Search
USPC ......................................................... 29/893.2
See application file for complete search history.

(56) References Cited

U.S. PATENT DOCUMENTS

| 2,397,382 A |   | 3/1946 | Smith |
|---|---|---|---|
| 4,376,333 A | * | 3/1983 | Kanamaru et al. .............. 29/432 |
| 6,883,997 B1 |  | 4/2005 | Ruschmann et al. |

FOREIGN PATENT DOCUMENTS

| AT | 291691 | 7/1971 |
|---|---|---|
| DE | 85 17 278.2 | 5/1988 |
| EP | 1 157 233 | 4/2006 |
| GB | 2 029 300 | 3/1980 |

* cited by examiner

*Primary Examiner* — David Bryant
*Assistant Examiner* — Moshe Wilensky
(74) *Attorney, Agent, or Firm* — Merchant & Gould P.C.

(57) ABSTRACT

The present invention relates to a method for manufacturing a shaft-hub component (1) having a shaft (2), a hub component (3; 10; 11; 12) and a shaft-hub connection for an armature of an electrical machine, comprising the steps: hardening of the shaft (2) at least on the outer lateral surface (6) of said shaft (2), shaping of the hardened shaft (2) such that a partial region (L1; L2; L3; L4) of said shaft (2) is shaped in such a manner that at least one radially projecting section (4) and one radially indented section (5) are produced and joining of said shaped shaft (2) and the hub component (3, 10, 11, 12) to the shaft-hub component so that said shaft-hub connection includes an interference fit at the projecting section (4), a hardness of said hub component (3; 10; 11; 12) being less than a surface layer hardness of said shaft (2). The invention further relates to a shaft-hub component for an armature of an electrical machine.

23 Claims, 6 Drawing Sheets

SHAFT-HUB COMPONENT AND METHOD FOR MANUFACTURING A COMPONENT OF THIS TYPE

This application is a National Stage Application of PCT/EP2008/065835, filed 19 Nov. 2008, which claims benefit of Serial No. 10 2007 057 704.6, filed 30 Nov. 2007 in Germany and Serial No. 10 2008 043 488.4, filed 5 Nov. 2008 in Germany and which applications are incorporated herein by reference. To the extent appropriate, a claim of priority is made to each of the above disclosed applications.

TECHNICAL FIELD

The present invention relates to a method for manufacturing a shaft-hub component, comprising a shaft and a hub component, a shaft-hub connection for an armature of an electrical machine as well as a shaft-hub component of this type.

BACKGROUND

Shaft-hub components are known from the technical field in different configurations. With regard to armatures for electrical machines, a hub component in the form of a stacked sheet metal laminate is, for example, fixed on a shaft. An established method is thereby to secure the hub component to the shaft using plastic, wherein apportioning and handling the plastic are a very involved and costly process. Furthermore, there is the risk that the connection comes apart due to aging. A shaft-hub connection is also known from the European patent publication EP 1 157 233 B1, in which deformation regions are configured on the outer surface of the shaft, which provide an interference-fit connection to the hub component. The hub component is disposed on the shaft such that the deformation regions of the shaft are centered on the hub component. Said deformation regions on the shaft are deformed during the joining operation.

Shaft-hub components of this type are used in small electric motors with a thin shaft between 4 and 10 mm, the shaft length being very large in comparison to the diameter. Due to the low buckling stability of shafts of this type, the known joining procedures employing press fitting are, however, problematic because inadmissible runout errors can especially occur. This results in undesired subsequent machining, respectively in a high percentage of rejection. Galling often occurs during the joining operation, particularly when mating steel to steel.

SUMMARY

The inventive method for manufacturing a component having a shaft, hub component and a shaft-hub connection with the characteristics of patent claim 1 has in contrast the advantage that the component can be simply and cost effectively provided. At the same time, the component manufactured in this manner has a long service life. An undesired galling of the hub component on the shaft during the joining operation, respectively damage to the component in particular at the shaft, can be avoided through the great difference in hardness between the shaft surface and the hub component. This is achieved according to the invention as a result of the shaft being at least surface hardened in a first step, wherein the shaft is hardened on its outer circumference. In so doing, merely a predetermined thin surface thickness is hardened or alternatively the shaft is hardened across its entire cross-section. The hardened shaft is subsequently shaped such that a partial region of the shaft is deformed in such a way that a section projects radially beyond an original outer circumference of the shaft and another section is radially pressed together. As a result of the hardening of the shaft's surface, a solidification of the shaft material in the radially projecting section, respectively of the serrations formed by said hardening, is produced. In other words, the at least surface hardened shaft is shaped such that the outer circumference thereof is out of round in this partial region, so that projecting connecting sections are provided for a connection to the hub component. The shaped shaft and the hub component are subsequently joined to one another, thus enabling the shaft-hub connection to be configured as an interference fit on the projecting section of the shaft. The hardness of the hub component is thereby less than the hardness of the shaft.

The entire shaft can, for example, be hardened, whereby not merely partial regions (of the outer lateral surface) of the shaft are hardened as, for example, bearing regions: a process which is both expensive and time intensive. The shaft can preferably be hardened in its entirety (its entire outer jacket), and a shaping of the hardened shaft is subsequently carried out. The hardening of the shaft can thereby merely be carried out in a thin peripheral region of the outer circumference so that the inner core of the shaft remains unhardened. In so doing, a shaping of the hardened shaft can be executed with acceptable amounts of force so that a deformation of the shaft occurs in such a manner that one or a plurality of sections of the shaft project beyond the original outside diameter. The service life of the notching tools can especially be increased if strictly the surface layer of the shaft is hardened.

The length of the shaped partial region in the axial direction of the shaft is preferably such that said length corresponds to an axial length of the hub component. It is thereby ensured that said shaped partial region of the shaft has a width, which corresponds to a width of the hub component, thus enabling a secure fixing of the hub component to the shaft. As an alternative, the shaping region can, however, also be configured shorter or longer than the axial length of the hub component.

The step of shaping the at least surface hardened shaft is further preferably carried out by means of a cylindrical section, respectively cylinder. Partially cylindrical dents are thereby configured on the shaft, and the projecting section on the shaft is formed corresponding to a bank. This bank thereby has a symmetrical shape and can be simply and quickly produced. In this instance, a punch with a cylindrical or half cylindrical carbide insert, whose outside surface is radially pressed into the shaft, can, for example, be used as the tool.

In a further embodiment, punches with a flat surface can also be pressed against the shaft, whereby the outer circumference of the shaft approximately forms, for example, a traverse with rounded corners. In so doing, banks of material are raised between the flat, indented surfaces, which then form the frictional locking or positive locking connection with the hub component. Relatively large forces can be exerted onto the shaft during this punching procedure without any wear to the punching tool. For this reason, this method is also especially suited to a fully hardened shaft with a large difference in hardness.

If on the other hand a punching tool having a relatively thin tip is used, said tool is suited for shafts, which have a smaller difference in hardness in the hub component. This is, for example, the case with surface hardening, which extends only to a small depth below the outer lateral surface, and the difference in hardness is thereby usually less developed. In this case, the notching tool can include an elongate, pointed notching strip (edges) or a punctiform or oval tip.

When a plurality of shaped partial regions is present on the shaft, a further preferred configuration of the present invention provides for said partial regions to be manufactured such that said partial regions are synchronously, i.e simultaneously, formed. This has the advantage that an even deformation takes place on all of the shaped partial regions of the shaft and that a plurality of projecting sections can be produced on the shaft in one step. The influences of friction can furthermore thereby be reduced during the shaping operation.

The shaping of the hardened shaft is furthermore preferred at exactly two sections of the shaft lying opposite each other, thereby enabling two projecting sections lying opposite each other on the shaft to be formed. In so doing, an unbalance in the shaft is particularly avoided. As an alternative, the shaping on the shaft can be carried out at exactly three positions of said shaft, the three positions being disposed in each case spaced from each other at an angle of 120° on the circumference of said shaft. An automatic centering effect is thereby achieved when the hub component is pushed onto the shaped shaft. This shaft too does not exhibit an unbalance due to the shaped regions. The shaping can likewise occur at four locations, said locations being preferably evenly disposed across the circumference of the shaft (approximate spacing of 4×90°). The shapings can thus be particularly easily formed with four approximately parallel notching strips, a pair of which is pressed against the other pair.

According to a further preferred configuration of the present invention, a thickness of the hardened surface layer is in a range between 0.01 mm and 4 mm, in particular between 0.2 mm and 1 mm, wherein a diameter of the shaft lies between 4 mm and 8 mm. It is hereby ensured that the peripheral region has on the one hand a sufficient hardness against wear or "galling", and nevertheless a simple and cost effective shaping of the surface hardened shaft is possible. A thickness of the hardened surface layer between 2.5 and 5% of the diameter of the shaft is particularly preferred. A length of the shaft preferably lies between 120 and 160 mm. A ratio of the shaft diameter to the shaft length is preferably 10 to 40, particularly preferred 20 to 30.

A plurality of shaped, radially projecting partial regions are preferably configured in the longitudinal direction, thereby enabling a plurality of hub components to be fixed on a shaft. Besides the armature, a ball bearing or a ring magnet or additional components can, for example, thereby be disposed on an armature shaft for an electrical machine.

The present invention further relates to a shaft-hub component for an armature of an electrical machine, comprising a shaft and a hub component, the shaft including a hardened, thin surface layer on the entire outer circumference and said shaft comprising at least one partial region produced after the hardening, which includes a deformation over an original outer circumference of the shaft. The connection between the shaft and the hub component is thereby an interference fit on the radially projecting region, and a hardness of said hub component is less than a hardness of said shaft. In so doing, a shaft-hub component for an armature of an electrical machine can be provided, which particularly does not have cracks or an intolerable warpage after the joining operation of the hub component to the shaft. The inventive shaft-hub component can be simply and cost effectively manufactured. A stacked sheet metal laminate consisting of a plurality of individual laminated sheets of metal can especially be used as the armature without damage thereby occurring to the shaft or the laminated sheets during the joining operation.

The hub component of the shaft-hub component is preferably a stacked sheet metal laminate consisting of a plurality of individual laminated sheets of metal or a ball bearing or a ring magnet or a bearing sleeve or an output drive gear.

It is thereby particularly preferred for a length of the shaped region of the shaft in the axial direction of said shaft to be equal to a width of the hub component to be fixedly attached there. In so doing, a secure fixing of the hub component to the shaft can be realized.

The present invention relates further to an electrical machine with a shaft-hub component having a hardened shaft and a hub component with less hardness than the shaft. Thus, with respect to the shaft, particularly only a thin surface layer was hardened and after the hardening a deformation of the shaft occurs such that an interference fit can be achieved between a projecting section of the shaft and the hub component during the joining operation.

The present invention can also be used with other shaft-hub components as, e.g., commutators or worm gears.

BRIEF DESCRIPTION OF THE DRAWINGS

Preferred exemplary embodiments of the invention are described below in detail with reference to the accompanying drawing. The drawing includes.

DETAILED DESCRIPTION

A shaft-hub component 1 according to a first exemplary embodiment of the invention is described below in detail with reference to FIGS. 1 to 4.

Figure 1:
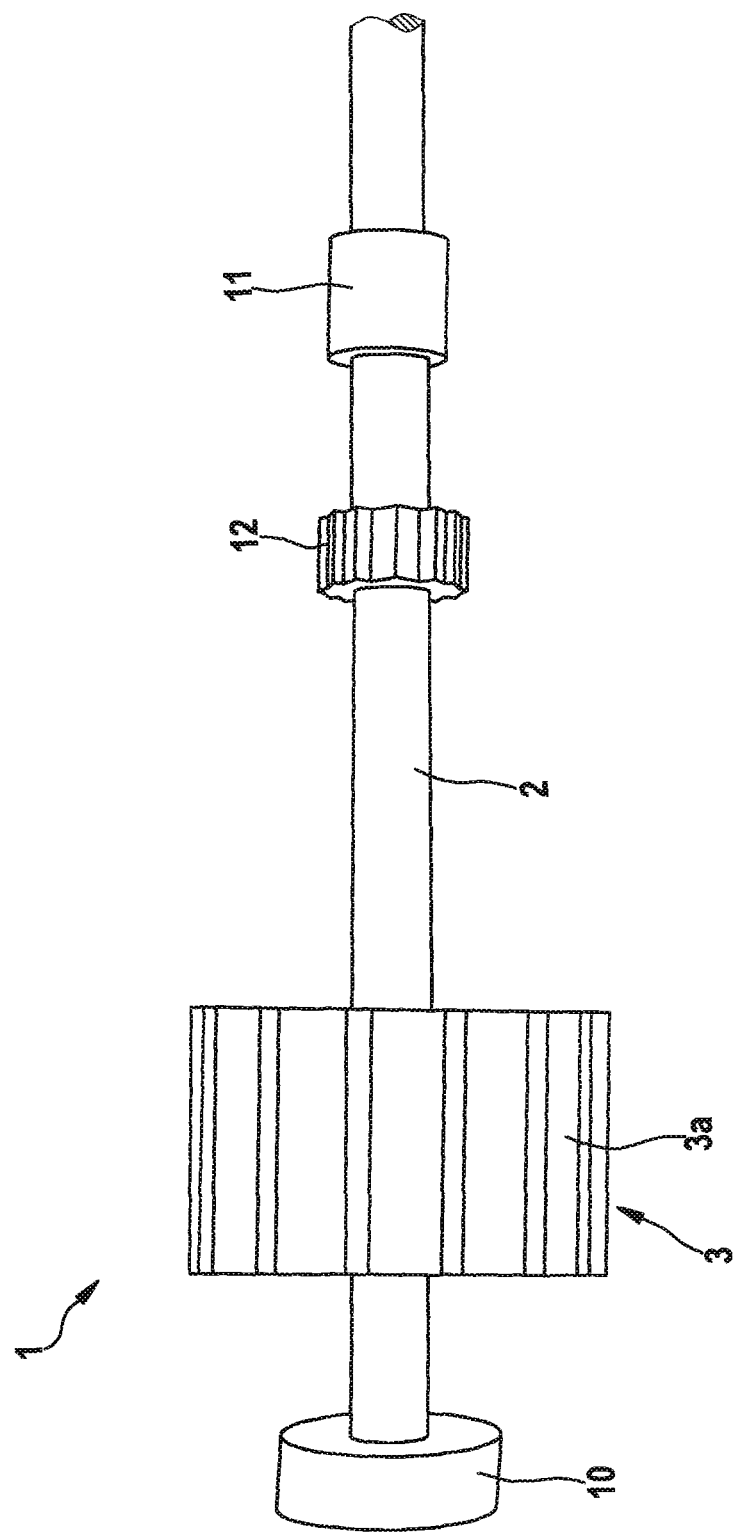
FIG. 1 a schematic view of a shaft-hub component according to a first exemplary embodiment of the present invention, FIG. 2 a schematic lateral view of the shaft from FIG. 1, FIG. 3 a sectional view along the line lll-lll of FIG. 2, FIG. 4 a schematic sectional view, which illustrates the step of the shaping of the shaft, and FIGS. 5 and 6 schematic sectional views of a shaft of a hub-shaft component according to further exemplary embodiments of the invention, FIGS. 7 and 8 schematic sectional views of a shaft having different punching tools according to the exemplary embodiments according to the invention.

FIG. 1 shows a lateral view of the shaft-hub component 1, which comprises a shaft 2 and a stacked sheet metal laminate 3. The stacked sheet metal laminate 3 is manufactured from a plurality of individual sheets 3a of metal. Additional hub components are furthermore disposed on the shaft 2 in the form of a bearing race 10, a bearing sleeve 11 as well as an output drive gear 12. All so-called hub components, i.e also the stacked sheet metal laminate 3, are thereby connected to the shaft 2 by means of interference fitting. The clearance sizes of the respective shaft-hub connection are thereby selected such that the inner hub components, i.e. the stacked sheet metal laminate 3 and the output drive gear 12, can be pushed without difficulty over the interference fit sections of the outer hub components, i.e. of the bearing race 10 and the bearing sleeve 11.

The shaft 2 of the shaft-hub component 1 includes a hardened surface layer region 20 and an unhardened inner region 21. The shaft is manufactured in this instance, for example, from a cold drawn C45 or C60 round steel, which has been surface hardened. As can be seen from FIG. 4, a thickness D2 of the hardened surface layer is thereby relatively small in comparison to a diameter D1 of the shaft. In this exemplary embodiment, a ratio of the thickness D2 to the diameter D1 is approximately 5%. Moreover, the shaft is very long in comparison to the diameter. The surface hardness of the surface layer is in this case approximately at 240 to 380 HV (Vickers hardness), which corresponds to 70 to 80 HR 15 N (Rockwell hardness).

Figure 2:
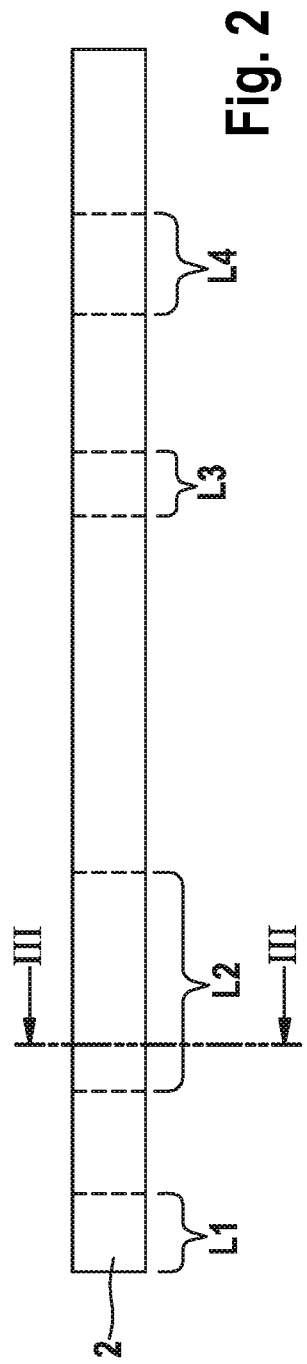

As can be seen in FIG. 2, the shaft 2 includes four shaped partial regions L1, L2, L3 and L4. Said shaped partial regions L1, L2, L3, and L4 are produced after the hardening of the surface layer of the shaft. A length of the shaped partial regions on the shaft 2, which is measured in the longitudinal direction of the shaft, thereby corresponds to a respective width of the associated hub component. That is to say that a width of the stacked sheet metal laminate 3 is equal to an axial length of the second shaped partial region L2. In the same manner, the axial lengths of the partial regions L1, L3 and L4 correspond to the widths of the bearing race 10, of the output drive gear 12 and of the bearing sleeve 11.

Figure 3:
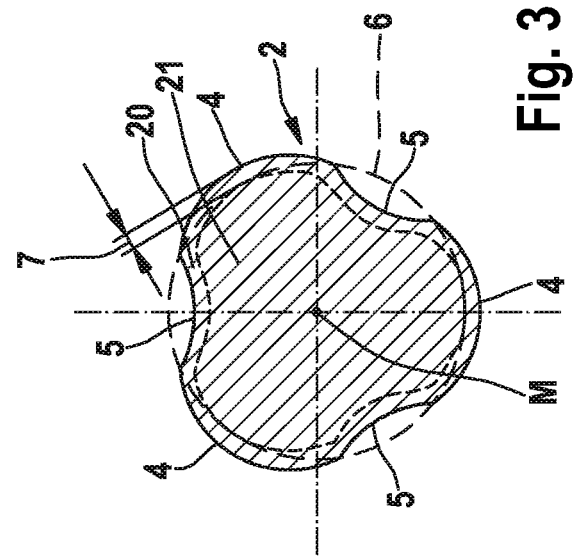

FIG. 3 shows schematically a cross-section of the shaft 4 at the shaped partial region L2. As can be seen from FIG. 3, the surface hardened shaft is shaped such that it comprises three projecting sections 4 and three indented sections 5. The projecting, respectively indented, sections are thereby disposed offset in relation to one another in each case by 120 E along the circumference of the shaft. The original outer circumference 6 is designated with a dashed line in FIG. 3. As a result, the excess dimensions 7 of the projecting section 4 can be seen. It should be noted that the three projecting sections as well as the three indented sections are in each case configured the same. In this exemplary embodiment, the excess dimensions 7 correspond to a thickness D2 of the hardened surface region. It is, however, also possible for the excess dimensions 7 to be larger or smaller than the thickness D2 of the hardened surface region.

Figure 4:
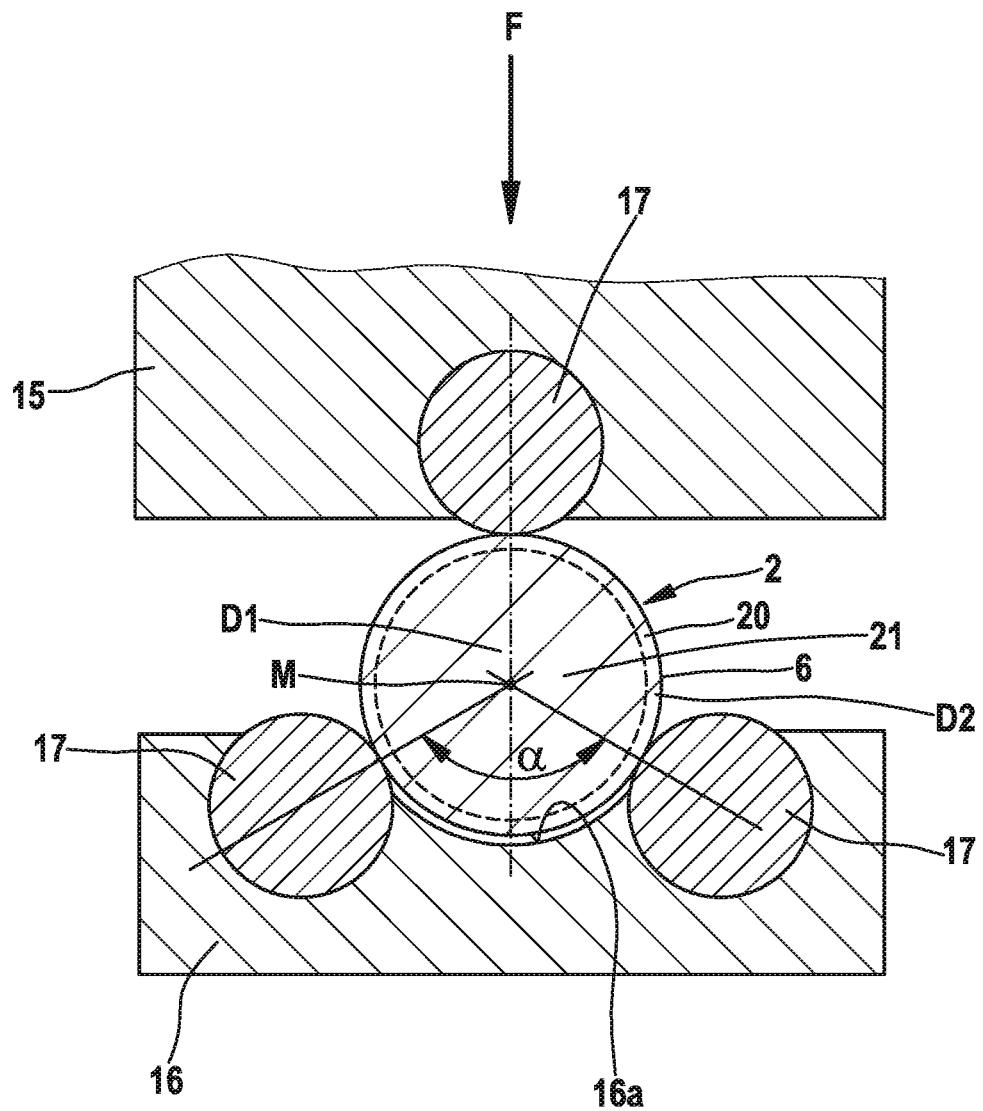

FIG. 4 shows schematically the shaping process of the shaft 2. Said shaft 2 is laid into a receptacle 16a of a die 16 after the surface layer has hardened. Two carbide cylinders 17 are disposed in said die 16. The carbide cylinders 17 are thereby disposed such that when the shaft is inserted a center M of the shaft 2 lies at the intersection of two lines through the centers of the two cylinders 17 of the die 16, an angle ∀ of 120° being formed between the two lines through the centers of said cylinders 17. A punch 15 with a further carbide cylinder 17 is furthermore provided, which is lowered onto the inserted shaft 2. This is indicated in FIG. 4 by the arrow F. An imaginary line between the center M of the shaft 2 and the carbide cylinder 17 is thereby parallel to the direction of the arrow F. By lowering the punch 15 in the direction of the die 16, the shaping processes on the shaft 2 are performed at the same time. That means that the indented sections 5 and the projecting sections 4 on the shaft 2 are produced at the same time. A length of the carbide cylinders 17 of the punch 15 and the die 16 thereby corresponds to in each case the widths of the shaped partial regions L1, L2, L3 and L4 to be produced. The shaping tool consequently comprises a plurality of carbide cylinder inserts 17, thus enabling the shaped partial regions on the shaft to be produced at the same time. In so doing, the shaping tool has a simple tool geometry, and the shaping process on the surface hardened shaft can be easily carried out. After the shaping process, the shaft 2 and the four hub components are then joined to one another, an interference fit between the shaft and each of the hub components being present in each case at the projecting sections 4. The dimensions of the interference fits are thereby selected such that the inner hub components can be guided without difficulty over the outer hub components. In order to ensure a secure interference fit, the materials of the hub components are thereby selected such that they are softer than the surface hardened shaft. As large a difference as possible in the hardness between the two parts to be joined should be present here.

Because the entire shaft 2 can be hardened according to the invention and it is not necessary to harden partial regions of the shaft 2, the hardening process can be carried out very quickly and cost effectively. The shafts can also be used for different electrical machines, in which the hub components are disposed at other positions in the longitudinal direction of the shaft 2. Especially the storage costs for shafts 2 of this type can also thereby be reduced. An individual labeling of the shafts 2, respectively the labeling of hardened sections of the shaft 2 by means of markings can be eliminated. By providing for three projecting sections 4, respectively three indented sections 5, per partial region of the shaft, an automatic centering can furthermore be achieved during the joining process. In so doing, a reliable assembly operation while reducing the scrap percentage can also be maintained. The shaft-hub component 1 of the first exemplary embodiment is used in electrical machines, particularly in small DC motors for motor vehicles. Areas of use particularly include windshield wiper motors, window-lift motors, fan drives or other electrical small drives in the motor vehicle.

Figure 5:
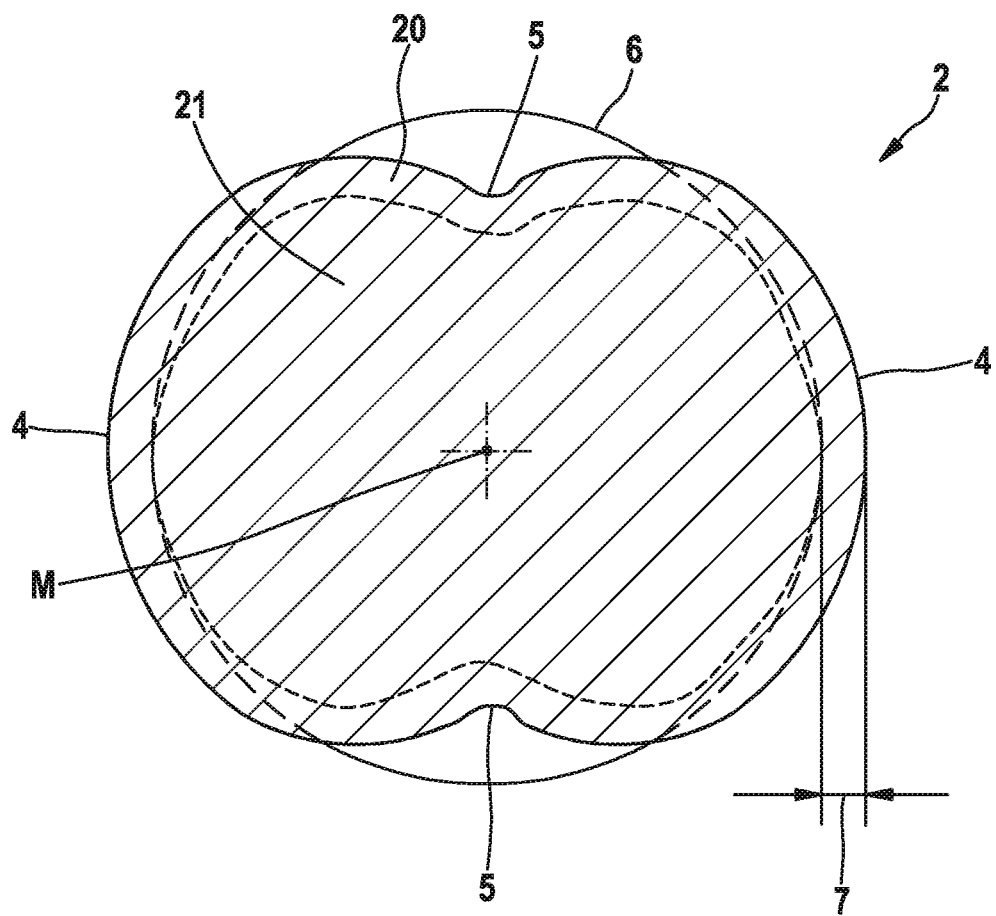

FIG. 5 shows a shaft 2 for a shaft-hub component according to a second exemplary embodiment of the invention. Like, respectively functionally like, parts are designated with the same reference numerals as in the first exemplary embodiment.

As can be seen in FIG. 5, the shaft 2 of the second exemplary embodiment comprises exactly two projecting sections 4, and the indented sections 5 are thereby in each case disposed opposite to one another. In order to manufacture a shaft 2 of this type, a shaping tool in particular can be very easily constructed. Especially the necessary forces for the shaping process of the surface hardened shaft 2 can thereby be reduced; respectively completely surface hardened shafts having a large difference in hardness can be shaped with said shaping process. The shaped partial region is thereby symmetrically shaped. This exemplary embodiment otherwise corresponds to the first exemplary embodiment so that reference can be made to the description given for said first embodiment. It should be noted with regard to the previously described exemplary embodiments that spheres, respectively tools in the shape of a segment of a sphere, can be used instead of the cylindrical shaping tools for producing the projecting, respectively indented, sections on the shaft.

Figure 6:
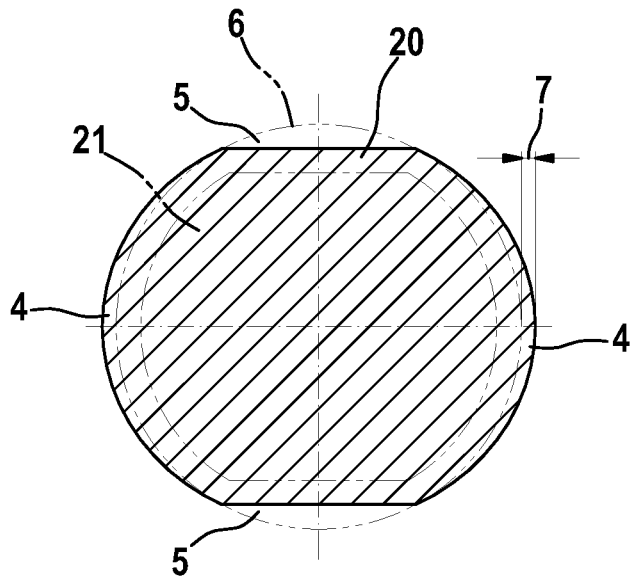

In a further exemplary embodiment, FIG. 6 likewise shows schematically a cross-section of the shaft at the shaped partial region L2. In contrast to FIG. 3, the hardened shaft 2 is shaped such that it comprises only two projecting sections 4 and only two indented sections 5. A radially projecting section 4 has thereby been formed on the shaft 2 using punches 15 with even, level faces 30. A completely through-hardened shaft 2 can, for example, also be used in this case. Like, respectively functionally like parts are designated with the same reference numerals as in the first exemplary embodiment.

Figure 7:
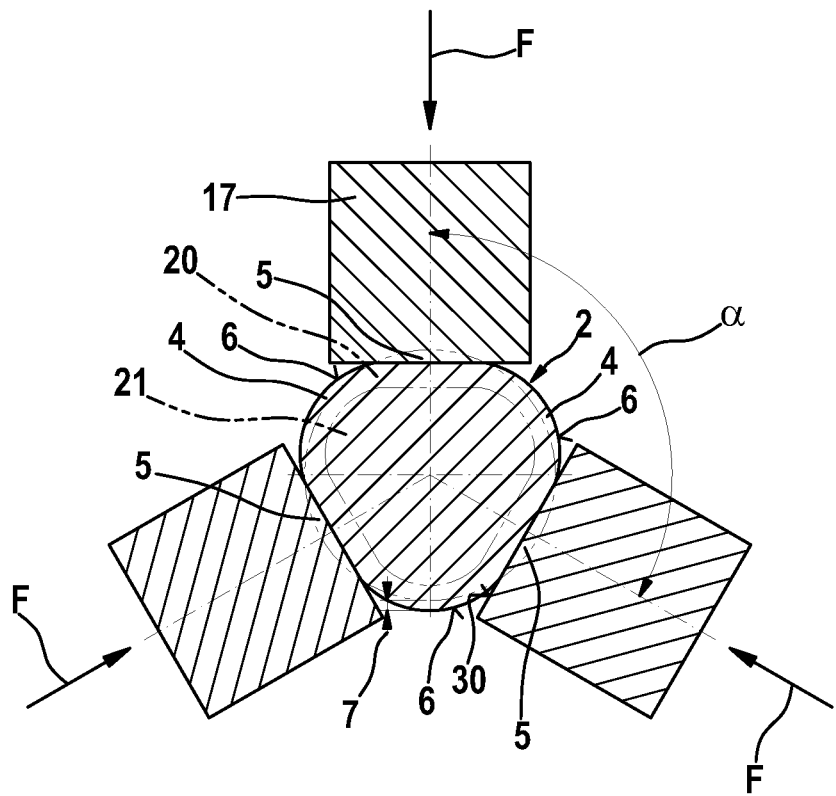

FIG. 7 shows schematically the shaping process of the shaft 2. Said shaft 2 is inserted after hardening in a tool with three synchronously actuated carbide punches 15. Said punches 15 form an angle ∀ of 120° to each other. They include a level punching face 30, which is radially pressed against the lateral surface 6 of the shaft 2. The shaping processes are simultaneously performed on the shaft 2 by the punches 15 being synchronously driven. That means that the indented sections 5 and the projecting sections 4 are produced at the same time. This action is indicated in FIG. 7 by the arrows F. The axial length of said punches 15 can thereby correspond to the length of the hub component 3, 10, 11, 12. After the shaping process, the shaft 2 and the hub component 3, 10, 11, 12 are then joined to one another. The large difference in hardness between the hardened shaft 2 and the softer hub component 3, 10, 11, 12 is very advantageous for a reliable joining operation without producing galling.

Figure 8:
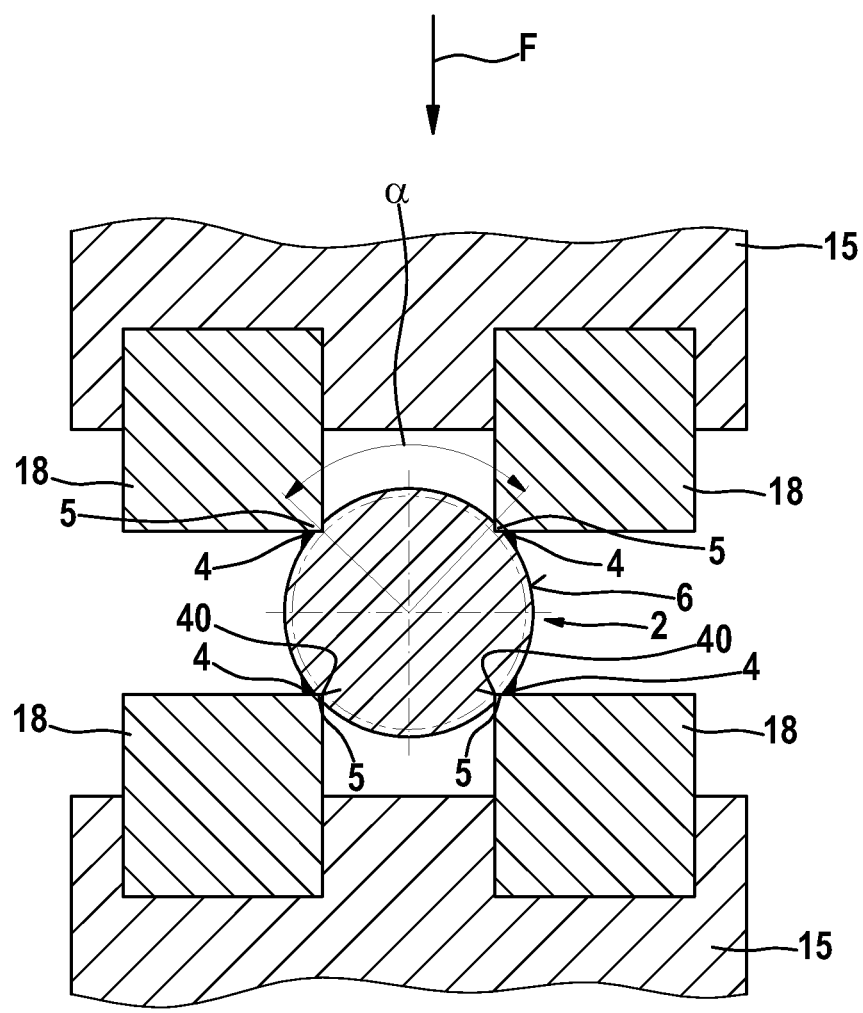

FIG. 8 further shows schematically the shaping process of the surface hardened shaft 2 in a further exemplary embodiment. The surface hardened shaft 2 is placed on two notching strips. Two other notching strips 18 are then simultaneously lowered onto said shaft 2. This is indicated in FIG. 8 by the arrows F. Indented sections 5 and projecting sections 4 are simultaneously produced by the penetration of the edges 40 of the notching strips. The four notching strips 18 form an angle ∀ of approximately 90° to each other. The length of the notching strips 18 can thereby correspond to the length of the hub component 3, 10, 11, 12, can, however, also be configured shorter or longer than the length of the hub component 3, 10, 11, 12. In order to increase the service life of the notching strip edge 40, the shaft 2 is hereby preferably hardened solely in a thin, outer surface layer, which is preferably configured 0.1 to 1.5 mm deep—for example approximately 0.7 mm deep. The surface hardness is thereby less than is the case with a completely through-hardened shaft 2. The shape of the notching strip edge 40 is preferably configured such that the shaft material cannot flow unhindered when the punching tool is pressed into said shaft 2, but is solidified and compressed along a sidewall of the edge, thus enabling in advance a clearly defined geometry of the radially projecting section 4 to emerge. In addition to the surface hardening, said section 4 than has an enhanced strength as a result of the compaction of the material. The tip of the notching strip edge 40—which can also be in particular of round or oval configuration—is asymmetrically configured to the pressing direction of the punch so that a material accumulation forms as a radially projecting section 4 substantially only on one side in the circumferential direction. After the shaping process, the surface hardened shaft 2 and the hub component 3, 10, 11, 12 are joined to one another.

The invention claimed is:

1. Method for manufacturing a shaft-hub component having a shaft, a hub component and a shaft-hub connection for an armature of an electrical machine, comprising the steps:
   hardening a surface layer of the shaft, wherein the surface layer of the shaft has a thickness from about 0.01 mm to about 0.1 mm, and wherein the hardening of the surface layer results in a hardness of 200 to 500 HV (hardness according to Vickers),
   shaping of the shaft such that a partial region of said shaft is shaped in such a manner that at least a radially projecting section and a radially indented section are produced, and wherein the radially indented sections are indented further than the thickness of the surface layer, and
   joining of the shaped shaft and the hub component to the shaft-hub component so that the shaft-hub connection includes an interference fit on the projecting section, a hardness of said hub component being less than a surface layer hardness of said shaft.

2. The method according to claim 1, wherein the shaped partial region of the shaft has a length in the axial direction of the shaft that is equal to or shorter than an axial length of the hub component.

3. The method according to claim 1, wherein the step of shaping the shaft takes place using a cylindrical section of a shaping tool or using planar punching.

4. The method according to claim 1, wherein the step of shaping the shaft takes place using a notching strip with an elongate tip.

5. The method according to claim 1, wherein a plurality of shaped partial regions is formed synchronously or consecutively on the shaft.

6. The method according to claim 1, wherein the shaping of a partial region of the shaft is carried out at exactly two positions of said shaft lying opposite each other.

7. The method according to claim 1, wherein the shaping of a partial region of the shaft is carried out at exactly three positions of said shaft, the three positions being disposed in each case at an angle of 120° on the circumference of said shaft, and wherein the three positions are shaped simultaneously.

8. The method according to claim 1, wherein the shaping of a partial region of the shaft is carried out at exactly four positions of said shaft, the four positions being disposed in each case at an angle of 90° on the circumference of said shaft, and wherein the four positions are shaped simultaneously.

9. The method according to claim 1, wherein the shaft has a diameter of said shaft between 4 mm and 10 mm.

10. The method according to claim 1, wherein the hardness on the outer lateral surface of the shaft lies in the range of 240 and 380 HV (hardness according to Vickers).

11. The method according to claim 1, wherein the shaping is performed by a die having at least a cylinder shaped projection contacting the shaft.

12. The method according to claim 11, wherein the die has three cylinder shaped projections contacting the shaft.

13. The method according to claim 12, wherein the cylinder shaped projections are spaced 120° apart.

14. The method according to claim 12, wherein three radially projecting areas and three radially indented sections are produced.

15. The method according to claim 11, wherein the radially indented sections are indented further than the thickness of the surface layer.

16. The method according to claim 15, wherein the shaping is performed without penetrating the surface layer.

17. The method according to claim 1, wherein the shaping is performed by a die having at least a level punching face contacting the shaft.

18. The method according to claim 17, wherein the die has three level punching faces.

19. The method according to claim 18, wherein the level punching faces are spaced 120° apart.

20. The method according to claim 19, wherein three radially projecting areas are produced.

21. The method according to claim 1, wherein the shaping is performed by a pressing tool comprising notching strips having edges, wherein the edges are radially spaced apart by about 90°.

22. The method according to claim 21, wherein the pressing tool has a pressing direction, and wherein each edge is formed by two surfaces, the first surface being generally parallel to the pressing direction and the second surface being generally perpendicular to the pressing direction.

23. The method according to claim 1, wherein the shaft has two ends, the ends having a first diameter, and wherein the shaped partial region is between the ends.

* * * * *